May 16, 1933. C. W. SPOHR 1,909,022
STRAINER PLUG AND METHOD OF CONSTRUCTING THE SAME
Filed Feb. 6, 1931
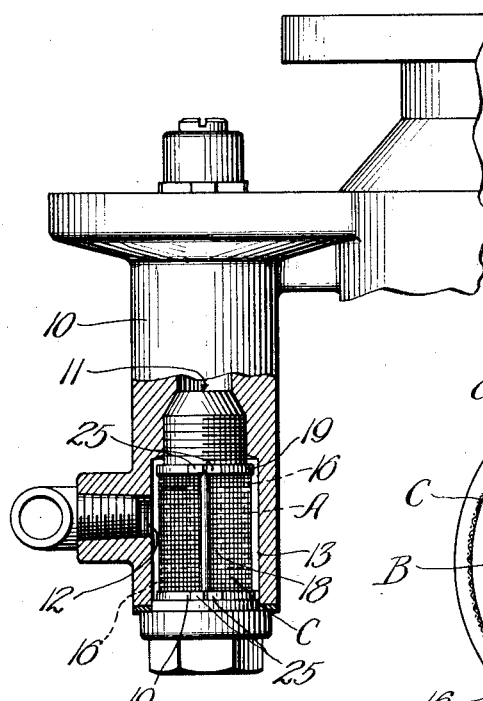
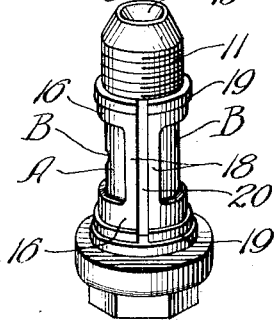
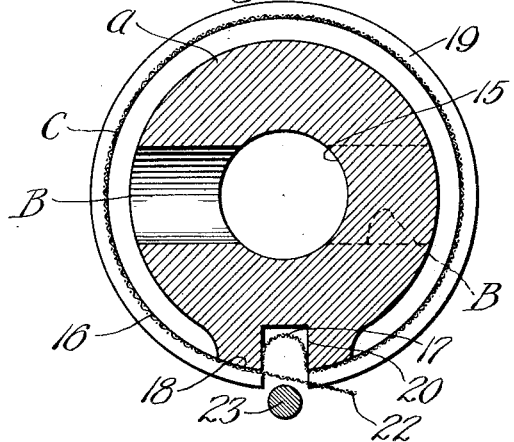
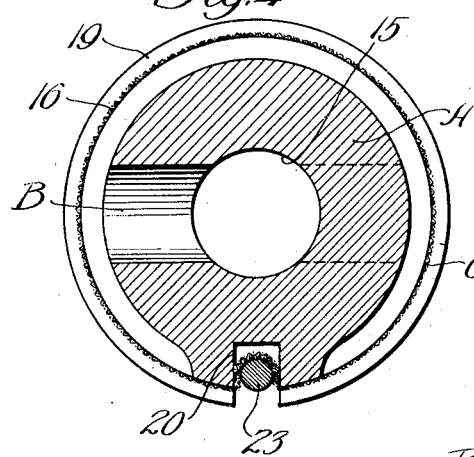
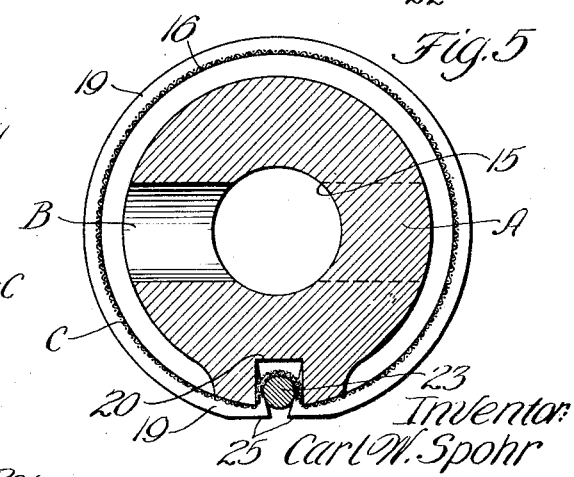
Inventor:
Carl W. Spohr
By Williams, Bradbury, McCaleb & Hinkle
Attys.

Patented May 16, 1933

1,909,022

UNITED STATES PATENT OFFICE

CARL W. SPOHR, OF CHICAGO, ILLINOIS, ASSIGNOR, BY MESNE ASSIGNMENTS, TO LYNN A. WILLIAMS, OF EVANSTON, ILLINOIS, AND CLIFFORD C. BRADBURY, OF GLENCOE, ILLINOIS, AS TRUSTEES

STRAINER PLUG AND METHOD OF CONSTRUCTING THE SAME

Application filed February 6, 1931. Serial No. 513,933.

My invention relates to strainer plugs, and more particularly to carburetor fuel strainer plugs and the method of constructing the same.

An object of my invention is to provide an improved strainer plug.

Another object is to provide a strainer plug wherein the strainer screen is secured in place mechanically without the use of solder, cement or other foreign material the ingredients of which might taint the fuel stream and cause harm to the carburetor fuel valve or other delicate mechanical parts thereof.

A further object is to provide a strainer plug in which the strainer screen is held taut and closely engaged with its supporting surfaces as a natural result of the method of construction employed so that no fuel admitted thereto may pass between the screen and its support as is often the case in that type of plug in which the screen is wrapped about the plug and its abutting edges soldered to one another.

A further object is to provide a strainer plug which will stand a great deal of abuse, as may occur while cleaning the screen through rough handling, without impairing the seal between screen and support.

Another object is to provide a strainer plug which may be constructed at an unusually low cost because of low material cost and short time consumed in labor.

Other objects and advantages will hereinafter appear.

I have illustrated an embodiment of my invention in the accompanying drawing forming a part of this specification in which:

Fig. 1 is a side elevation of the strainer plug and associate parts of an internal combustion engine carburetor;

Fig. 2 is a perspective view of a part of the strainer plug;

Fig. 3 is an enlarged sectional view of the strainer plug during one step of its construction;

Fig. 4 is a view similar to Fig. 3 but during a later step of construction; and

Fig. 5 is a view similar to Fig. 3 after the final construction step.

In general my improved strainer plug comprises a hollow body A, having openings B through its side walls through which fuel admitted to the body must pass, and a screen C encompassing the side walls for preventing the passage of solid matter into the body. The invention lies in the means employed for mounting and securing the screen in place.

The strainer plug is usually fixed in the lower end of the fuel chamber 10 of the carburetor (see Fig. 1) by the engagement of an externally threaded portion 11 of the body A with a corresponding internally threaded portion of the inner wall of the chamber 10.

A fuel inlet 12 of the chamber 10 is connected with a source of fuel supply so that fuel is discharged into the chamber into that space 13 surrounding the side walls of the plug. All fuel so admitted must pass through the screen C before it may enter through the openings B and into the hollow interior 15 of the plug A where it may proceed upwardly into the principal part of the fuel chamber.

With reference to Fig. 2, it will be noted that the body A is constructed with annular surfaces 16 at opposite sides of the openings B which stand out from the major surface of the body and that these surfaces 16 are interconnected by a contiguous longitudinally extending surface 18. Outstanding shoulders 19 are formed at the remote ends of the surfaces 16. A slot 20 is formed in the body extending longitudinally of the surface 18 and across the adjacent surfaces 16 and shoulders 19.

In the construction of my improved strainer plug the strainer screen C is cut rectangular in shape and one edge is rolled in the form of a bead 17 that may be slipped into the slot 20 as shown in Fig. 3 extending along the slot from one of the shoulders 19 to the opposite shoulder. The screen is thereupon wrapped about the body A so that its upper and lower edge portions are brought into contact with the surfaces 16 while the major portion of the screen lies away from the body (see Fig. 1). The opposite end 22 of the screen is brought over the slot 20 as shown in Fig. 3 and a locking pin 23 is placed parallel to the slot in front of the screen. The locking pin 23 is as long as the slot 20.

The pin 23 is then pressed into the slot causing the free end of the screen to be drawn in therewith and to closely engage and conform with the contour of its opposite beaded edge 17 (see Fig. 4). This step in the process of construction causes the screen C to be drawn tightly into engagement with the surfaces 16 as well as effecting a seal between the opposite edges thereof. I consider this a most important feature since no preliminary stretching of the screen is necessary to effect the proper disposition of the screen upon the body, nor is any act concurrent therewith necessary to bring about the tightening of the screen except for the forcing of the pin into position within the slot.

The parts thus assembled are next disposed horizontally upon a bed and the shoulders 19 subjected to a swedging operation at those portions immediately adjacent to the slot 20 as shown at 25 in Fig. 5. This swedging operation securely locks the pin 23 in place to permanently hold the parts in position as assembled.

A strainer plug constructed in accordance with the foregoing specifications presents the advantage of little possibility of the passage of extraneous substances between the screen and the body as the screen must by virtue of the manner in which it is secured to the body lie closely engaged therewith and permanently maintain that condition. It is not uncommon in strainer plugs of the type wherein solder is employed to fix the screen in place to find the screen sagging away from the body because of a lack of extreme care in holding the screen tight when soldering. No such trouble may occur as a result of the construction herein described and the possibility of the action of the acids used in soldering to affect the delicate parts of the carburetor is, of course, entirely removed.

I claim:

1. The method of securing a strainer screen about the body of a strainer plug which consists in first wrapping the screen about the side walls of the plug with the adjacent ends thereof in registration with a longitudinal slot formed in the plug wall, in forcing a locking pin into said slot drawing one edge of the screen therewith to cause the screen to tighten about the plug and in swedging the adjacent parts of the plug about the ends of the pin to lock the pin in place.

2. A strainer plug comprising a hollow body provided at one end with a screwthreaded portion to engage in the bore of a carbureter inlet and at its other end formed with a polygonal head by means of which the screwthreaded portion may be engaged and tightened in the bore, said polygonal head further serving to close the open end of the bore, a passage extending through body wall of said plug, a strainer screen surrounding that portion of the body wall through which the passage extends, said body having a slot extending longitudinally along its outer surface and a locking pin engaging with said screen and said slot for maintaining the screen tightly bound about said body.

3. A strainer plug comprising a hollow body provided at its ends with external flanges, intermediate flanges adjacent said first named flanges for supporting a strainer screen spaced from the body proper of the plug, aligned slots in said external flanges, a strainer screen, and a locking pin engaging with said screen and said slots for maintaining the screen tightly bound about said body.

4. A strainer plug comprising a hollow body provided with external slotted projections, a longitudinal rib extending radially from said body and provided with a slot in registration with the respective slots in said projections, annular flanges adjacent to and inwardly of said external slotted projections, a strainer screen wrapped about said body but supported in spaced relation thereto by said annular flanges and rib, and a locking pin engaging with said screen and slots for maintaining the screen tightly bound about said body.

5. A strainer plug comprising a hollow body provided at one end with a bevelled seat and a screwthreaded portion for engagement with the bore of a carbureter fuel inlet and at its other end formed with a polygonal head by means of which the screwthreaded portion may be engaged and tightened in the bore, said polygonal head further serving to close the open end of the bore, a strainer screen surrounding a portion of the body wall, spaced annular flanges for supporting said screen in spaced relation to the body proper, slotted projections adjacent to and outwardly of said annular flanges, and a locking pin engaged with the screen and the slots of said projections for maintaining the screen tightly bound about said body.

In witness whereof, I hereunto subscribe my name this 19 day of January 1931.

CARL W. SPOHR.